United States Patent
Kim

(10) Patent No.: US 12,217,561 B2
(45) Date of Patent: Feb. 4, 2025

(54) DOCK SHELTER MODULE PROVIDED WITH DUAL GATE AND AIR CURTAIN

(71) Applicant: Jae Jung Kim, Yongin-si (KR)

(72) Inventor: Jae Jung Kim, Yongin-si (KR)

( * ) Notice: Subject to any disclaimer, the term of this patent is extended or adjusted under 35 U.S.C. 154(b) by 598 days.

(21) Appl. No.: 17/617,474

(22) PCT Filed: Jun. 12, 2020

(86) PCT No.: PCT/KR2020/007620
§ 371 (c)(1),
(2) Date: Dec. 8, 2021

(87) PCT Pub. No.: WO2020/251292
PCT Pub. Date: Dec. 17, 2020

(65) Prior Publication Data
US 2022/0237968 A1 Jul. 28, 2022

(30) Foreign Application Priority Data

Jun. 13, 2019 (KR) .................. 10-2019-0069742

(51) Int. Cl.
*G07C 9/00* (2020.01)
*B65G 69/00* (2006.01)
(Continued)

(52) U.S. Cl.
CPC ....... *G07C 9/00563* (2013.01); *B65G 69/008* (2013.01); *E06B 9/58* (2013.01);
(Continued)

(58) Field of Classification Search
CPC .. G07C 9/00563; B65G 69/008; B65G 69/28; E06B 9/58; E06B 7/22; F24F 9/00; F24F 2009/005; G08B 21/18; F25D 23/023
See application file for complete search history.

(56) References Cited

U.S. PATENT DOCUMENTS

| 2003/0145535 | A1* | 8/2003 | DiBiase | ............... | B65G 69/006 |
|---|---|---|---|---|---|
| | | | | | 52/173.2 |
| 2006/0199497 | A1* | 9/2006 | Smith | ....................... | F24F 9/00 |
| | | | | | 454/173 |

(Continued)

FOREIGN PATENT DOCUMENTS

| CN | 208236291 U | * 12/2018 |
|---|---|---|
| JP | 2002-302213 A | 10/2002 |

(Continued)

OTHER PUBLICATIONS

English translation of KR-20180038091-A, dated Jul. 13, 2024 (Year: 2024).*

(Continued)

*Primary Examiner* — Edelmira Bosques
*Assistant Examiner* — Brett Peterson Mallon
(74) *Attorney, Agent, or Firm* — NKL Law; Jae Youn Kim

(57) ABSTRACT

The present invention relates to a dock shelter module that is disposed at a side of a warehouse and connects the inside and outside of the warehouse, dock shelter module comprising: a top frame; a pair of side frames coupled to both sides of the top frame, longitudinally extending, and forming a loading-unloading space in cooperation with the top frame; a bottom frame coupled to the lower ends of the side frames and having a dock leveler seated thereon; a first gate coupled to the top frame, disposed at the front of the loading-unloading space, and opening and closing the outside of the warehouse and the loading-unloading space; a second gate coupled to the top frame, disposed at the rear of the loading-unloading space, and opening and closing the inside of the warehouse and the loading-unloading space; and an air curtain generator installed on the bottom of the top frame between the first gate and the second gate, and forming an air curtain in the loading-unloading space in accordance (Continued)

with whether the first gate and the second gate are opened and closed.

16 Claims, 11 Drawing Sheets

(51) Int. Cl.
*E06B 9/58* (2006.01)
*F24F 9/00* (2006.01)
*G08B 21/18* (2006.01)

(52) U.S. Cl.
CPC .......... *F24F 9/00* (2013.01); *F24F 2009/005* (2013.01); *G08B 21/18* (2013.01)

(56) References Cited

U.S. PATENT DOCUMENTS

| | | | |
|---|---|---|---|
| 2006/0254003 A1* | 11/2006 | Grunewald | B65G 69/008 14/71.1 |
| 2008/0104902 A1* | 5/2008 | Ashelin | B65G 69/008 248/585 |
| 2009/0291627 A1* | 11/2009 | Zimmermann | F24F 9/00 700/275 |
| 2010/0186319 A1* | 7/2010 | Magee | B65G 69/006 454/195 |
| 2011/0181792 A1* | 7/2011 | Hammonds | A47F 11/06 348/E3.048 |
| 2018/0108192 A1* | 4/2018 | Ho | G07C 9/253 |

FOREIGN PATENT DOCUMENTS

| | | | |
|---|---|---|---|
| JP | 3897732 B2 | | 3/2007 |
| JP | 6411582 B1 | | 10/2018 |
| KR | 10-1379909 B1 | | 4/2014 |
| KR | 20180038091 A | * | 4/2018 |
| KR | 10-2090118 B1 | | 3/2020 |

OTHER PUBLICATIONS

English translation of CN-208236291-U, dated Jul. 13, 2024 (Year: 2024).*

* cited by examiner

DOCK SHELTER MODULE PROVIDED WITH DUAL GATE AND AIR CURTAIN

TECHNICAL FIELD

The present disclosure relates to a dock shelter module having a dual gate and an air curtain and, more particularly, to a dock shelter module having a dual gate composed of a first gate and a second gate. According to the present disclosure, when a sensor senses opening of a gate, the inside of a warehouse and a channel communicate with each other and an air curtain is formed, and when the sensor senses closing of the gate, the outside of the warehouse and the channel communicate with each other and an air curtain is formed, whereby it is possible to prevent leakage of the cold air in the warehouse and to prevent contaminants from entering the warehouse from the outside.

BACKGROUND ART

Description of this section only provides the background information of the present disclosure without configuring the related art.

A dock shell or a dock shelter maintains temperature by preventing transfer of cold air or hot air of the inside of a warehouse by sealing the space between a vehicle and a building when a vehicle is connected to the warehouse for loading and unloading. Further, the dock shell or a dock shelter prevents external contaminants from entering the building and the vehicle.

In general, freight that needs to be kept cold is not unloaded from a transport vehicle and directly carried into a cold storage warehouse. To this end, the dock seal or dock gate is installed on a wall of the dock.

FIG. 1 is a view showing a dock system having a sealing structure of the related art.

As shown in FIG. 1, a dock system of the related art is configured to effectively seal a front space and a side space using a front sealing part and side sealing parts.

The dock system of the related art also has the problem that air freely flows inside and outside a warehouse from the process of loading freight to the process of opening and closing a door. Further, the dock system has a single sealing unit, so there is a problem that the sealing ability is insufficient and appropriate sealing according to the sizes of vehicles is impossible. Prior Art Document: Korean Patent NO. 10-1950696

DISCLOSURE

Technical Problem

The present disclosure has been made in an effort to solve the problems of the related art and an objective of the present disclosure is to provide a dock shelter module of which the sealing ability is improved by forming a loading-unloading space with a top frame, side frames, and a bottom frame and disposing a dual gate at the front and rear, that can prevent air from flowing inside and outside a warehouse in loading and unloading by having an air curtain generator, and that forms an appropriate sealing structure regardless of the sizes of transport vehicle.

The objectives of the present disclosure are not limited to the objects described above and other objects will be clearly understood by those skilled in the art from the following description.

Technical Solution

In order to solve the problems described above, a dock shelter module according to the preset disclosure may include: a top frame; a pair of side frames coupled to both sides of the top frame and longitudinally extending; a bottom frame coupled to the lower ends of the side frames and having a dock leveler seated thereon; a first gate opening and closing the outside of the warehouse and a loading-unloading space; a second gate opening and closing the inside of the warehouse and the loading-unloading space; and an air curtain generator installed on the bottom of the top frame and forming an air curtain in the loading-unloading space.

The top frame may include a top channel and a top valve selectively controlling the flow of air, in which the top channel may include a first top channel of which an end is connected with the inside of the warehouse and the other end is connected to the top valve, a second top channel of which an end is connected with the outside of the warehouse and the other end is connected to the top valve, and a third top channel of which an end is connected to the air curtain generator and the other end is connected to the top valve.

The bottom frame may include a bottom channel communicating with the bottom frame and the inside and outside of the warehouse, and a bottom valve selectively controlling the flow of bottom air.

The dock shell module further includes an opening-closing sensor that senses whether the first gate and the second gate are opened and closed, and a controller that controls the top valve and the bottom valve and controls operation of the air curtain generator so that an air curtain is formed in accordance with whether the gates are opened and closed.

The side frames may have guides for guiding up-down movement of the first gate and the second gate, and the top frame may have a winder that winds and keeps the first gate and the second gate at the lower end of the top frame.

The dock shelter module may further include a security module that requires input of pre-stored user information to open the first gate and the second gate, in which the user information and information about opening and closing may be transmitted and stored in a server.

The closing speed of the first gate is set faster than the closing speed of the second gate when the first gate and the second gate are closed.

The dock shell module may further include a sealing device that is disposed in the top frame, the side frames, and the bottom frame, and seals gaps by moving when a transport vehicle "is connected to the warehouse, and the sealing device may have air spray nozzles for spraying air.

The bottom frame may further include a drying device and a drying spray nozzle for drying and sterilizing the loading-unloading space after loading/unloading is finished.

The second gate may have a reflective plate on a first surface thereof that faces the inside of the warehouse, and may have an air-pocket insulator on a second surface thereof that faces the loading-unloading space, thereby having a dual structure.

A bumper attenuating shock may be further disposed at the top frame, the side frames, and the bottom frame, and the bumper may include a sensor that recognizes approach when a transport vehicle approaches, and sends out a signal alarm when the transport vehicle approaches within a predetermined distance.

The first gate may be made of a transparent material, and the dock shelter module may further include a video device that outputs a video on the front surface of the first gate such that a commercial video can be seen with the first gate closed.

Advantageous Effects

The effects of the present invention having the configuration described above are as follows.

First, a dual gate is provided ahead of and behind a loading-unloading space, it is possible to effectively isolate the inside and outside of a warehouse not only during loading/unloading, but in normal time.

Second since an air curtain generator is disposed on the bottom of a top frame and an air curtain is formed during loading/unloading, it is possible to cold air in a warehouse from flowing outside and prevent contaminants from entering the warehouse from the outside.

Third, since a security module is provided, it is possible to enhance security by storing opening and using history of gates.

Fourth, channels and valves are disposed in a top frame and a bottom frame, so it is possible to enable air to smoothly circulate when an air curtain is formed. Further, a controller that automatically performs control in accordance with whether gates are opened and closed, so it is possible to effectively seal a loading-unloading space.

Fifth, since a sealing device that seals the gaps between the freight compartment of a transport vehicle and frames, and air spray nozzle are included, there is an advantage that it is possible to effectively seal a loading-unloading space during loading/unloading.

The effects of the present disclosure are not limited to those described above and other effects not stated herein may be made apparent to those skilled in the art from claims.

DESCRIPTION OF DRAWINGS

Not only the following detailed description of preferred embodiments of the present disclosure, but the summary described above will be understood well when they are read with the accompanying drawings. Preferred embodiments are shown in the drawings to exemplifying the present disclosure. However, it should be understood that the present disclosure is not limited by the accurate disposition and means in the drawings.

BEST MODE

Hereafter, embodiments of the present disclosure are described in detail with reference to the accompanying drawings. However, the accompanying drawings are provided only for more easily describing the present disclosure and it would be apparent to those skilled in the art that the scope of the present disclosure is not limited to the accompanying drawings.

Further, it should be noted that when embodiments of the present disclosure are described, components having the same functions are only given the same names and reference numbers and are not substantially completely the same as components of the related art.

Terms used in the present specification are used only to describe specific exemplary embodiments rather than limiting the present disclosure. Singular forms are intended to include plural forms unless the context clearly indicates otherwise. It will be further understood that the term "comprises" or "have" used in this specification, specify the presence of stated features, steps, operations, components, parts, or a combination thereof, but do not preclude the presence or addition of one or more other features, numerals, steps, operations, components, parts, or a combination thereof.

Figure 7:
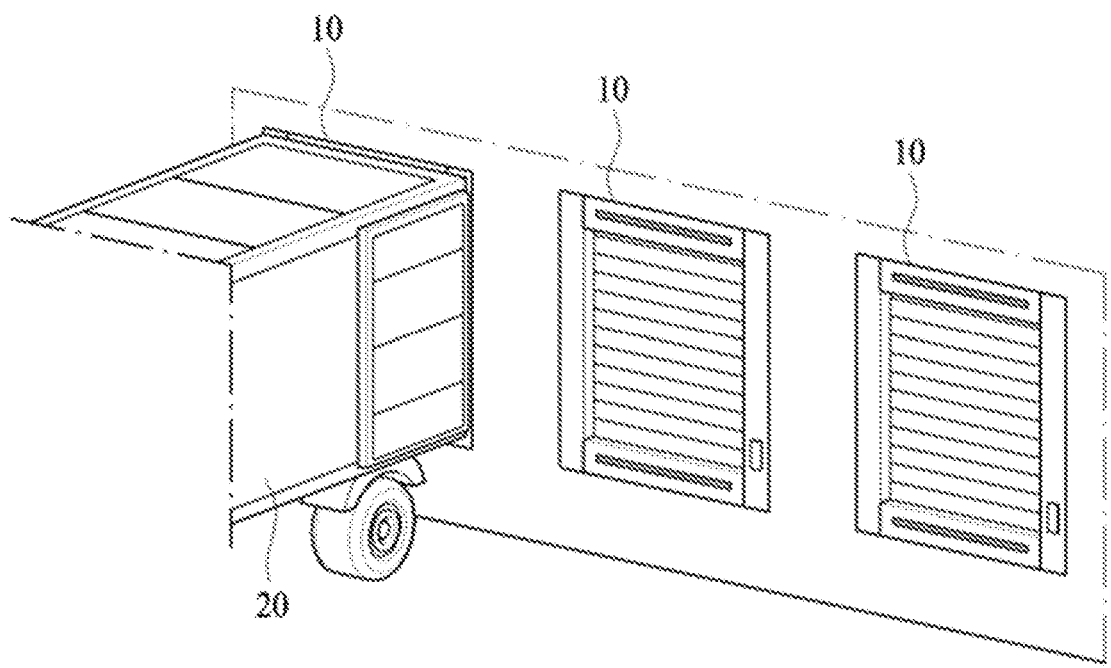
FIG. 7 is a view showing the state in which the dock shelter module according to the first embodiment of the present disclosure is installed at a warehouse.

FIG. 7 is a view showing the state in which a dock shelter module according to a first embodiment of the present disclosure is installed at a warehouse.

In general, a dock shell or a dock shelter is installed by boring a hole through a wall when a distribution warehouse is constructed. However, the dock shelter according to the present disclosure is modularized, so it can be separately manufactured, transported, and installed.

Figure 1:
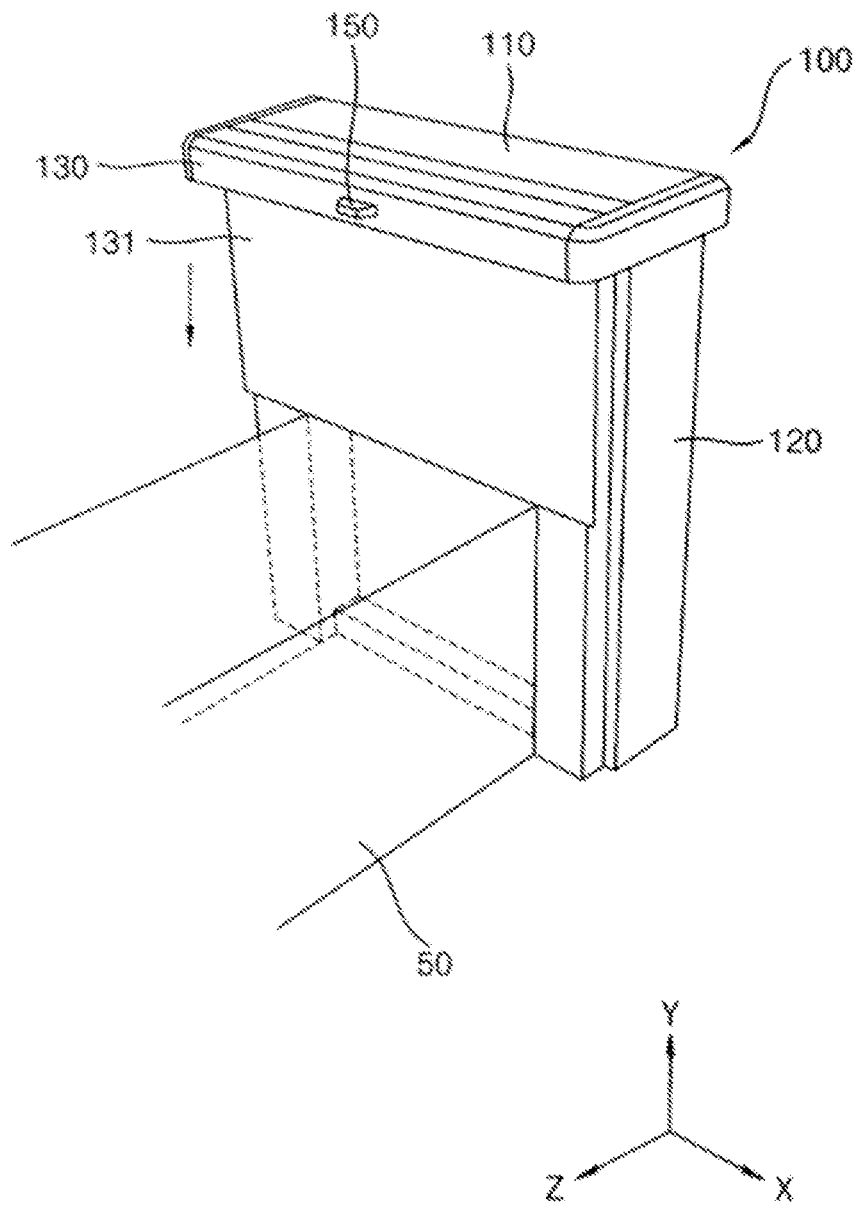
FIG. 1 is a view showing a dock system of the related art.
Figure 2:
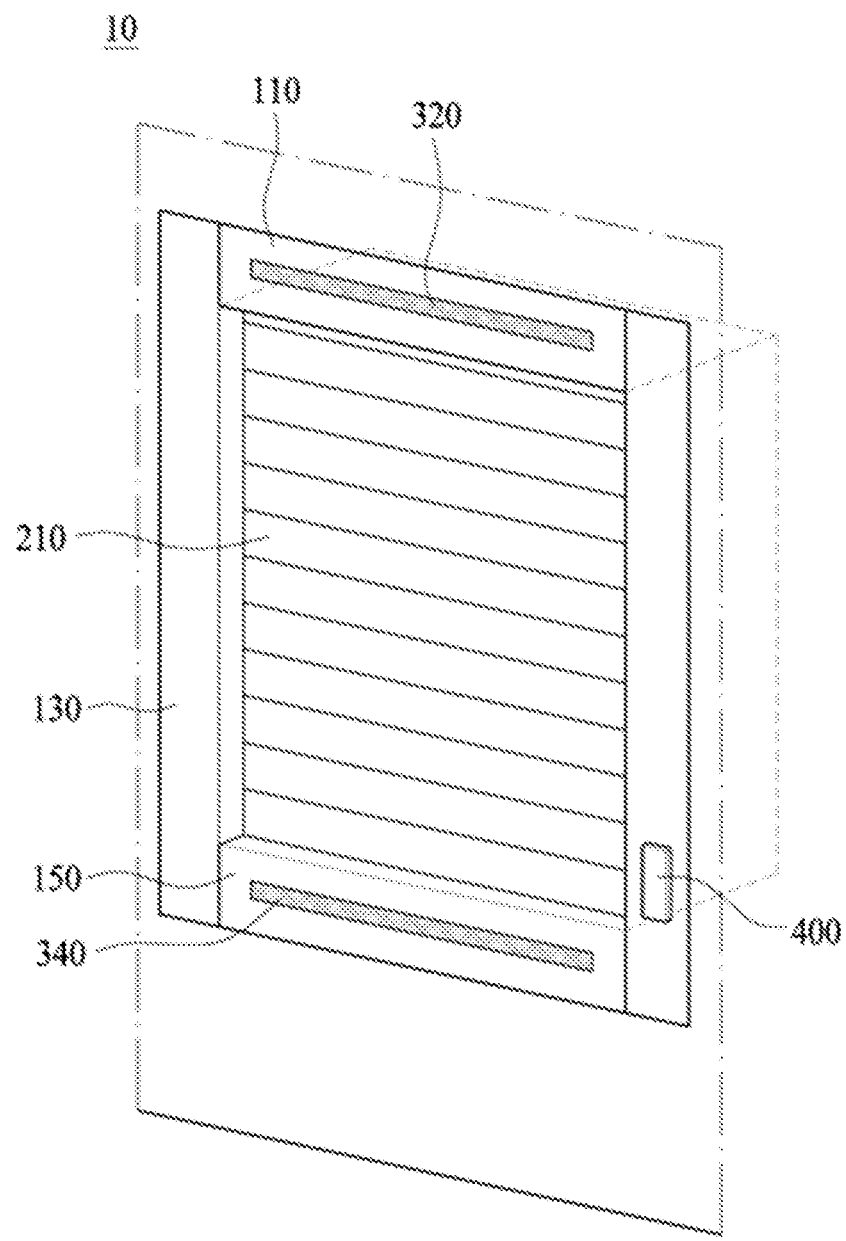
FIG. 2 is a perspective view showing the state in which a gate of a dock shelter module according to a first embodiment of the present disclosure is closed.
Figure 3:
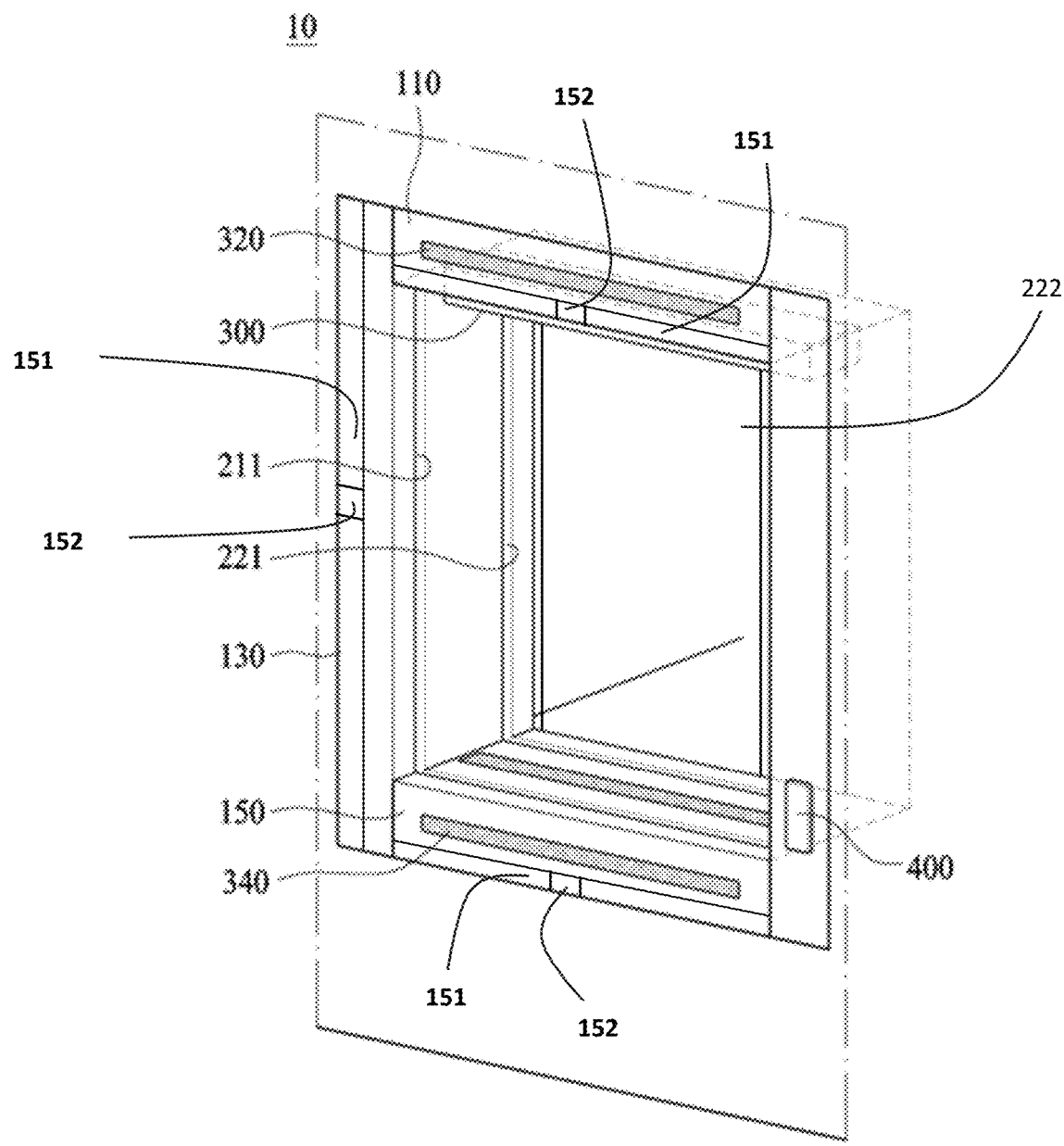
FIG. 3 is a perspective view showing the state in which the gate of the dock shelter module according to the first embodiment of the present disclosure is open.

FIG. 2 is a perspective view showing the state in which a gate of a dock shelter module according to a first embodiment of the present disclosure is closed, and FIG. 3 is a perspective view showing the state in which the gate of the dock shelter module according to the first embodiment of the present disclosure is open.

As shown in FIGS. 2 and 3, a dock shelter module 10 according to the first embodiment of the present disclosure is disposed at a side of a warehouse, thereby becoming a passage connecting the inside and outside of the warehouse. Accordingly, when freight is loaded on and unloaded from the freight compartment of a transport vehicle 20, the dock shelter becomes a connection passage through which freight is directly carried into the warehouse.

The dock shelter module 10 according to the first embodiment of the present disclosure, in order to maintain the internal temperature of a warehouse by preventing cold air or heat in the distribution warehouse to flowing outside in loading and unloading and in order to contaminants from entering the warehouse from the outside of the warehouse, may include a top frame 110, side frames 130, a bottom frame 150, a first gate 210, a second gate 220, and an air curtain generator 300.

A loading-unloading space may be formed between the warehouse and the freight compartment of a transport vehicle by the top frame 110, the side frames 130, and the bottom frame 150. The side frames 130 are coupled to both sides of the top frame 110 and longitudinally extend, and the bottom frame 150 is coupled to the lower ends of the side frames 130. That is, a side of the side frame 130 is coupled to the top frame 110 and the other side is coupled to the bottom frame 150. The dock shelter module 10 according to the first embodiment of the present disclosure may have a loading-unloading space through which freight is moved, by the top frame 110, the side frames 130, and the bottom frame 150.

The top frame 110, the side frames 130, and the bottom frame 150 may further include a bumper 151 that attenuate shock. The bumper can prevent damage by absorbing shock when the transport vehicle approaches and collides with the frames. The bumper may further include a sensor 152 that recognizes approach when the transport vehicle 20 approaches, and sends out a signal alarm when the transport vehicle 20 approaches within a predetermined distance.

In the present disclosure, the outside of a warehouse is defined as the front of a loading-unloading space and the inside of the warehouse is defined as a rear of the loading-unloading space. The first gate 210 and the second gate 220 are coupled to the top frame 110, thereby being able to open and close the loading-unloading space. The first gate 210 is disposed at the front of the loading-unloading space, thereby being able to open and close the outside of the warehouse and the loading-unloading space. The second gate 220 is disposed at the rear of the loading-unloading space, thereby being able to open and close the loading-unloading space and the inside of the warehouse.

The air curtain generator 300, which is a device that forms an air curtain by spraying air to the loading-unloading space, may be installed between the first gate 210 and the second gate 220 on the bottom of the top plate 110.

The gate is open during loading-unloading, so there is a problem that cold air in the warehouse flows to the outside and external contaminants enters the warehouse. Since the air curtain generator 300 for an air curtain, it is possible to prevent the cold air in the warehouse from flowing outside and contaminants outside the warehouse from entering the warehouse.

The dock shelter module 10 according to the first embodiment of the present disclosure may further include a security module 400 that requires input of pre-stored user information to open the first gate 210 and the second gate 220. When a user inputs user information, information of the date and time of opening and closing the first gate 210 and the second gate 220 can be transmitted and stored to a separate server together with the user information. To this end, a separate management server connected with the security module 400 through wireless communication may be provided, which is not described in detail as the related art.

The security module 400 includes a fingerprint sensor or an iris sensor, thereby enabling a user to input and store fingerprint information or iris information in advance and to input corresponding information to open the first gate 210 and the second gate 220. Since the security module 400 is provided, security is enhanced and the loading-unloading work history is stored, whereby it is possible to effectively manage stocks.

When loading/unloading is finished and the first and second gates 210 and 220 are closed to close the loading-unloading space, the closing speed of the first gate 210 may be set faster than the closing speed of the second gate 220. This is because since the second gate 220 opens and closes the inside of the warehouse and the loading-unloading space, it is required to quickly close the second gate after loading/unloading is finished in order to prevent the cold air in the warehouse from flowing outside. On the contrary, since the first gate 210 opens and closes the loading-unloading space and the outside of the warehouse, the humidity in the loading-unloading space should be sufficiently discharged out of the warehouse, so the closing speed of the first gate 210 may be set slower than the closing speed of the second gate 220.

Since the second gate 220 is in contact with the inside of the warehouse filled with cold air, vapor may condensate into waterdrops due to the temperature difference between the loading-unloading space and the inside of the warehouse. When water exists in the loading-unloading space, the loading-unloading space may be contaminated or a safety accident may occur due to a slip in loading-unloading. Accordingly, the second gate 220 may need to be made of a heat insulator. To this end, the second gate 220 has a reflective plate 222 on the surface facing the inside of the warehouse and an air-pocket insulator on the surface facing the loading-unloading space, so it can be configured in a dual structure.

Figure 4:
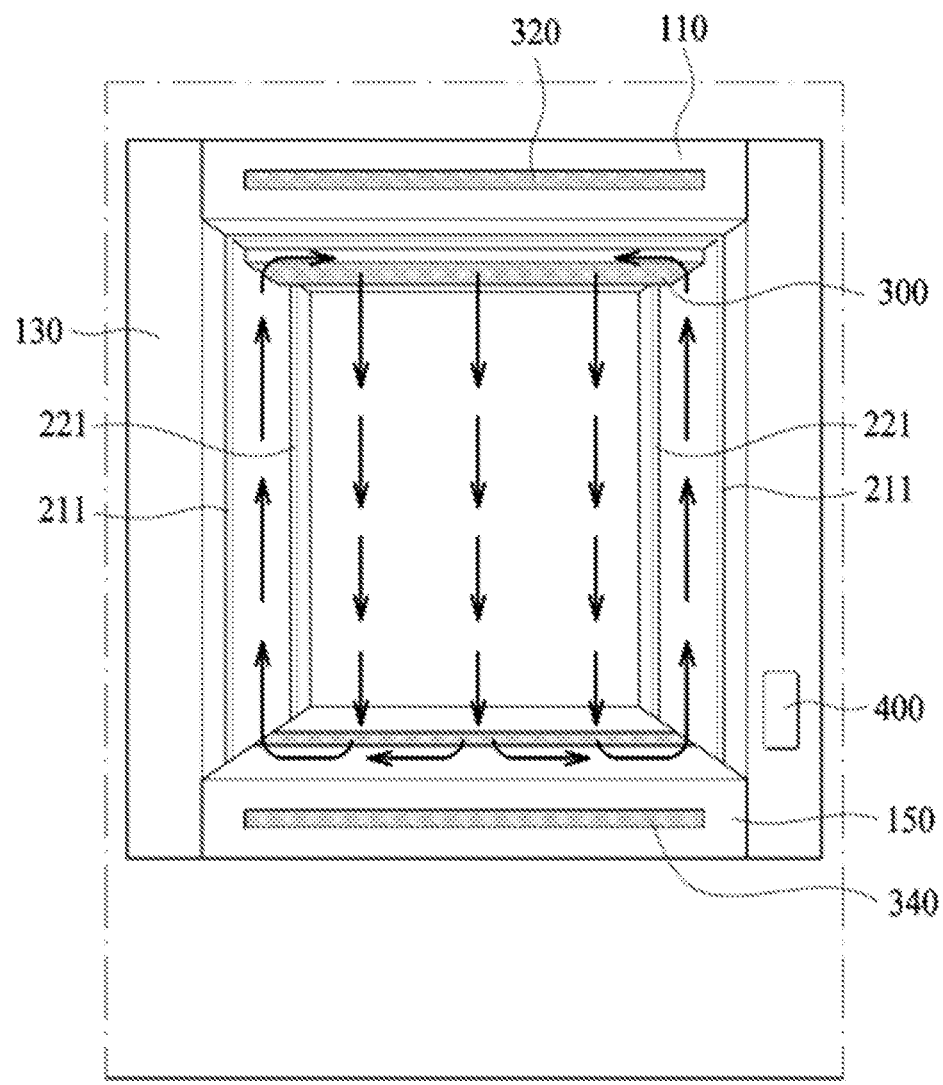
FIG. 4 is a view showing flow of air when an air curtain generator of the dock shelter module according to the first embodiment of the present disclosure is in operation.

FIG. 4 is a view showing flow of air when an air curtain generator of the dock shelter module according to the first embodiment of the present disclosure is in operation.

Referring to FIG. 4, an air curtain may be formed in the loading-unloading space by the air curtain generator 300. Air is sprayed toward the bottom frame 150 from the air curtain generator 300 installed at the top frame 110, whereby it is possible to prevent the cold air in the warehouse from flowing outside and contaminants outside the warehouse from entering the warehouse. The sprayed air can flow into bottom frame 150 and then can continuously circulate in the loading-unloading space through the side frames 130. A duct (not shown) that communicates with the frame assembly or the loading-unloading space and through which air can flow may be provided in the bottom frame 150 and the side frames 130 for air circulation.

Figure 5:
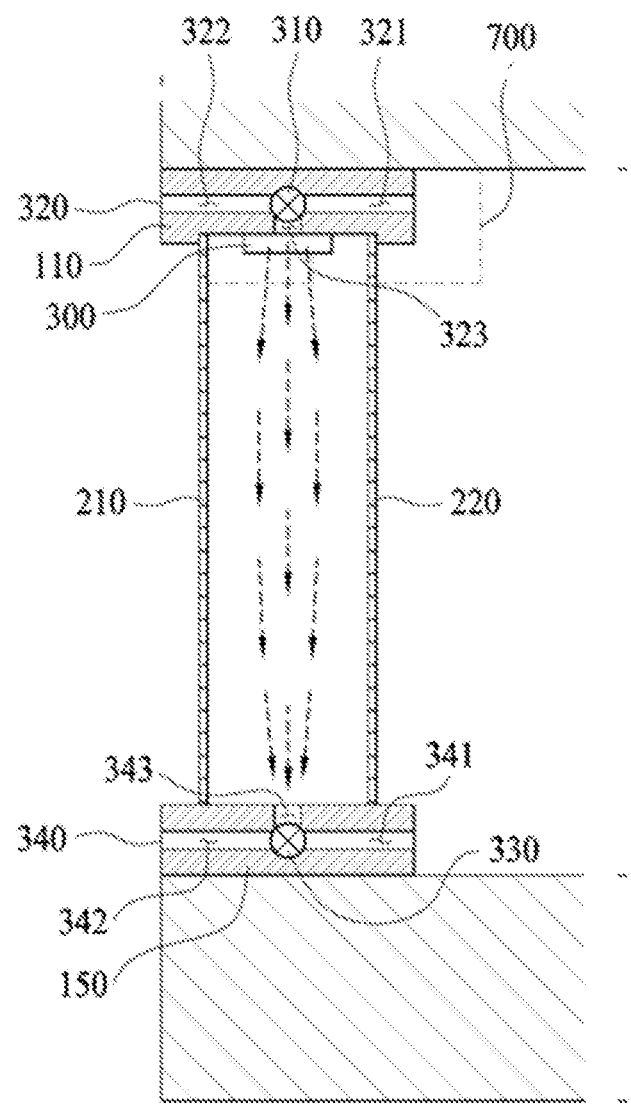
FIG. 5 is a side cross-sectional view showing the dock shelter module according to the first embodiment of the present disclosure.

FIG. 5 is a side cross-sectional view showing the dock shelter module according to the first embodiment of the present disclosure.

A top channel 320 that communicates with the air curtain generator 300 of the warehouse and the inside and outside of the warehouse may be formed in the top frame 110. A top valve 310 for selectively controlling inflow of air, if necessary, as a passage through which air to be supplied to the air curtain flows inside may be disposed at the top channel 320.

The dock shelter module 10 according to the first embodiment of the present disclosure may be configured such that cold air is sprayed to maintain the temperature in the warehouse during loading/unloading and such that hot air is sprayed to dry the loading-unloading space after loading/unloading is finished. To this end, the top channel 320 may be composed of a first top channel 321, a second top channel 322, and a third top channel 323.

In the top channel 320, an end of the first top channel 321 is connected with the inside of the warehouse and the other end is connected with the top valve 310; an end of the second top channel 322 is connected with the outside of the warehouse and the other end is connected to the top valve 310; and an end of the third top channel 323 is connected to the air curtain generator 300 and the other end is connected to the top valve 310.

This configuration is described in detail with reference to FIG. 5. When the first gate 210 and the second gate 220 start to open for loading/unloading, the air curtain generator 300 is operated and an air curtain is formed. In this case, cold air may be sprayed from the air curtain generator 300 by the cold air in the warehouse. When the top valve 310 is set to communicate with the third top channel 323, the cold air in the warehouse can flow to the air curtain generator 300 through the third top channel 323 after flowing in the first top channel 321. Since the cold air in the warehouse flows into the air curtain generator 300 during loading/unloading with the first gate 210 and the second gate 220 open, cold air is sprayed and an air curtain is formed. Accordingly, it is possible to prevent a loss of the cold air in the warehouse and there is no need for a separate compressor, etc. for producing cold air, so there is an effect of a simple structure and a low cost.

When loading/unloading is finished and the first gate 210 and the second gate 220 start to close, the air that flows into the air curtain generator 300 is switched with the air outside the warehouse. To this end, the top valve 310 is configured such that the second channel having an end connected with the outside of the warehouse is connected with the third channel. When the air outside the warehouse flows into the second top channel 322 and flows to the air curtain generator 300 through the third top channel 323, hot air can be sprayed from the air curtain generator 300. Though not shown in the figures, a separate heater may be disposed at the top frame 110 so that air that flows inside can be sprayed with the temperature increased.

When cold air is sprayed and the loading-unloading space is closed during loading/unloading, the cold air in the loading-unloading space condensates, so dew condensation may occur. Accordingly, the loading-unloading space may be contaminated, or a safety accident may occur in the following loading/unloading. Therefore, it is possible to dry the loading-unloading space by spraying hot air.

Further, as shown in FIG. 5, a bottom channel 340 may also be formed in the bottom frame 150. The bottom channel 340 passes air such that the air sprayed from the air curtain generator 300 can flow inside and circulate. A bottom valve 330 that selectively controls the flow of air may be disposed at the bottom channel 340.

The bottom channel 340 may be composed of a first bottom channel 341 of which an end is connected with the inside of the warehouse and the other end is connected to the bottom valve 330, a second bottom channel 342 of which an end is connected with the outside of the warehouse and the other end is connected to the bottom valve 330, and a third bottom channel 343 of which an end is connected to the bottom of the bottom frame 150 and the other end is connected to the bottom valve 330.

When cold air is sprayed from the air curtain generator 300 during loading/unloading, the cold air flows to the bottom frame 150 and flows into the third bottom channel 343 connected to the bottom frame 150. The air flowing in the third bottom channel 343 flows to the bottom valve 330. The bottom valve 330 is set such that the third bottom channel 343 and the first bottom channel 341 communicate with each other with the first gate 210 and the second gate 220 open. Accordingly, the air flowing inside can flow to the first bottom channel 341 and can be discharged back into the warehouse.

When loading/unloading is finished, hot air is sprayed from the air curtain generator 300 and flows into the third bottom channel 343. In this case, the bottom valve 330 is set such that the third bottom channel 343 and the second bottom channel 342 communicate with each other. Accordingly, the air flowing inside flows to the second bottom channel 342 and is discharged out of the warehouse.

Since the bottom channel 340 is formed, the air sprayed from the air curtain generator 300 smoothly circulates, so an excellent effect of preventing the cold air in the warehouse from flowing outside and external contaminants from flowing inside is achieved.

Though not shown in the figures, a fan that make the flow of air smooth may be further disposed in the top channel 320 and the bottom channel 340, whereby air is enabled to smoothly flow inside and outside.

Figure 6:
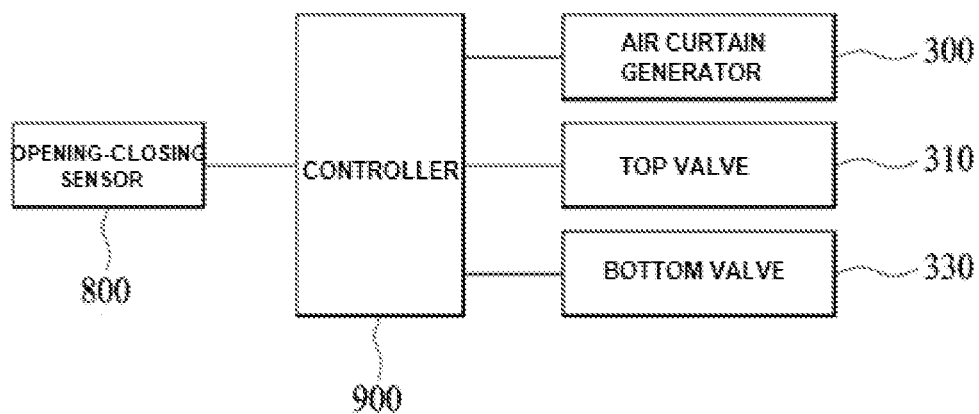
FIG. 6 is a block diagram schematically showing operation of the dock shelter module according to the first embodiment of the present disclosure.

FIG. 6 is a block diagram schematically showing operation of the dock shelter module according to the first embodiment of the present disclosure.

Referring to FIG. 6, the dock shelter module 10 according to the first embodiment of the present disclosure may further include: an opening-closing sensor 800 that senses whether the first gate 210 and the second gate 220 open or close; and a controller 900 that controls the top valve 310 and the bottom valve 330 and operation of the air curtain generator 300.

When the opening-closing sensor 800 senses opening of the first gate 210 and the second gate 220, the controller 900 can output an operation signal of the air curtain generator 300 and can control the top valve 310 such that the first top channel 321 and the third top channel 323 communicate with each other.

When the opening-closing sensor 800 senses opening of the first gate 210 and the second gate 220, the controller 900 can control the bottom valve 330 such that the first bottom channel 341 and the third bottom channel 343 communicate with each other.

Accordingly, when the first gate 210 and the second gate 220 are opened for loading/unloading, the air curtain generator 300 can automatically form an air curtain using the cold air in the warehouse. The air sprayed from the air curtain generator 300 can be continuously circulated in the warehouse by the bottom channel 340, it is possible to effectively prevent the air in the warehouse from flowing outside and contaminants from flowing inside from the outside of the warehouse.

When closing of the first gate 210 and the second gate 220 is sensed, the controller 900 can control the top valve 310 such that the second top channel 322 and the third top channel 323 communicate with each other. In this case, when a separate heater for increasing the temperature of external air is provided, the controller 900 may control operation of the heater. The controller 900 may output an operation stop signal of the air curtain generator 300 after a predetermined time passes.

When closing of the first gate 210 and the second gate 220 is sensed, the controller 900 can control the bottom valve 330 such that the second bottom channel 342 and the third bottom channel 343 communicate with each other. Accordingly, when the first gate 210 and the second gate are closed, external air flows into the air curtain generator 300 and sprayed. The sprayed air is discharged outside through the bottom channel 340, whereby air can be circulated.

Figure 8:
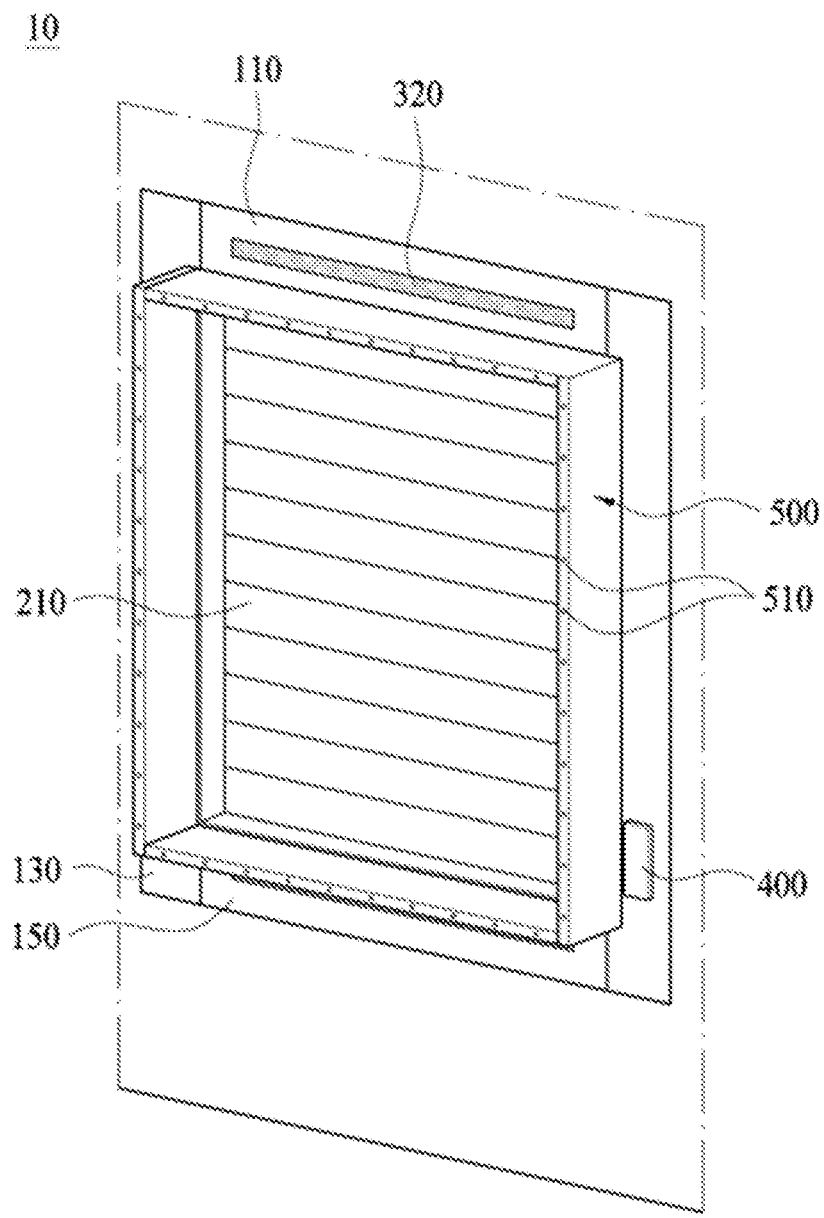
FIG. 8 is a view showing the state in which a dock shelter module according to a second embodiment of the present disclosure is equipped with a sealing device.
Figure 9:
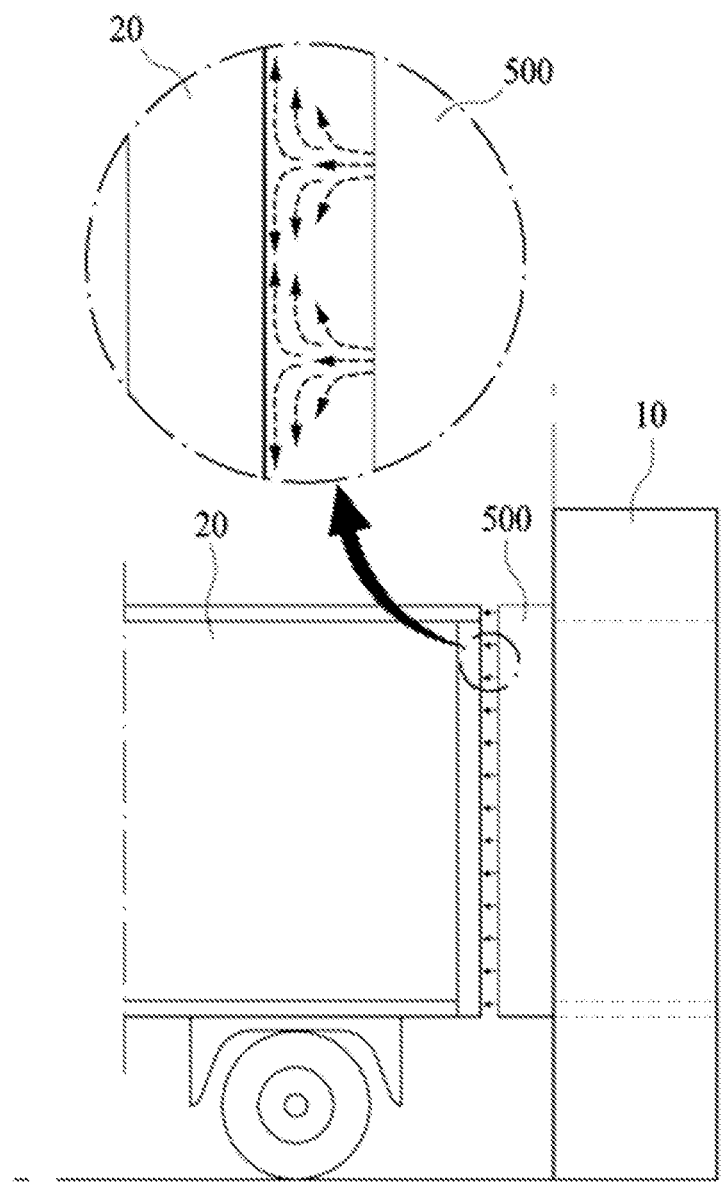
FIG. 9 is a view showing the state in which the sealing device of the dock shelter module according to the second embodiment of the present disclosure is connected to a freight compartment of a transport vehicle.

FIG. 8 is a view showing the state in which a dock shelter module according to a second embodiment of the present disclosure is equipped with a sealing device and FIG. 9 is a view showing the state in which the sealing device of the dock shelter module according to the second embodiment of the present disclosure is connected to a freight compartment of a transport vehicle.

Referring to FIG. 8, a dock shelter module 10 according to the second embodiment of the present disclosure may further include a sealing device 500. When a transport vehicle is connected to the warehouse for loading/unloading, the sealing device 500 can seal the gaps between the freight compartment, the top frame, the side frames, and the bottom frame.

To this end, the sealing device 500 is composed of four rectangular frames of top, bottom, left, and right frames, and may be disposed in the top frame 110, the side frames 130, and the bottom frame 150, respectively. Accordingly, the sealing device is maintained in the frames when loading/unloading is not performed. When the transport vehicle 20 is connected to the warehouse for loading/unloading, the four frames of the sealing device 500 are moved to protrude out of the frame toward the transport vehicle 20 and brought in close contact with the freight compartment, thereby being able to seal the gaps. The protrusion length of the sealing device 500 from the frames is maximally within 30 cmm, and preferably, within 15 cm and 30 cm. The length means the distance that the sealing device 500 can move toward the freight compartment of the transport device 20 from the top frame 110, the side frames 130, and the bottom frame 150.

The entire sealing device 500 or the portion thereof that is in contact with the transport vehicle 20 may be made of an electromagnet. When the sealing device is in close contact with the freight compartment of the transport vehicle 20, a current flows, so magnetism is generated. Accordingly, they are strongly connected by the magnetic force, whereby the gaps can be effectively sealed. Further, after loading/unloading is finished, the current is removed, and the sealing device can be easily separated from the freight compartment.

Air spray nozzles 510 that spray air to the surface that is connected to a freight compartment may be disposed at the rectangular frames of the sealing device 500.

Referring to FIG. 9, air can be sprayed forward from the air spray nozzles 510. The freight compartment of the transport vehicle 20 is uneven, so it is difficult to completely come in close contact with the sealing device 500. Accordingly, it is possible to prevent dust, insects, etc. from entering the gap between the frames and the freight compartment by spraying air through the air spray nozzles 510.

Figure 10:
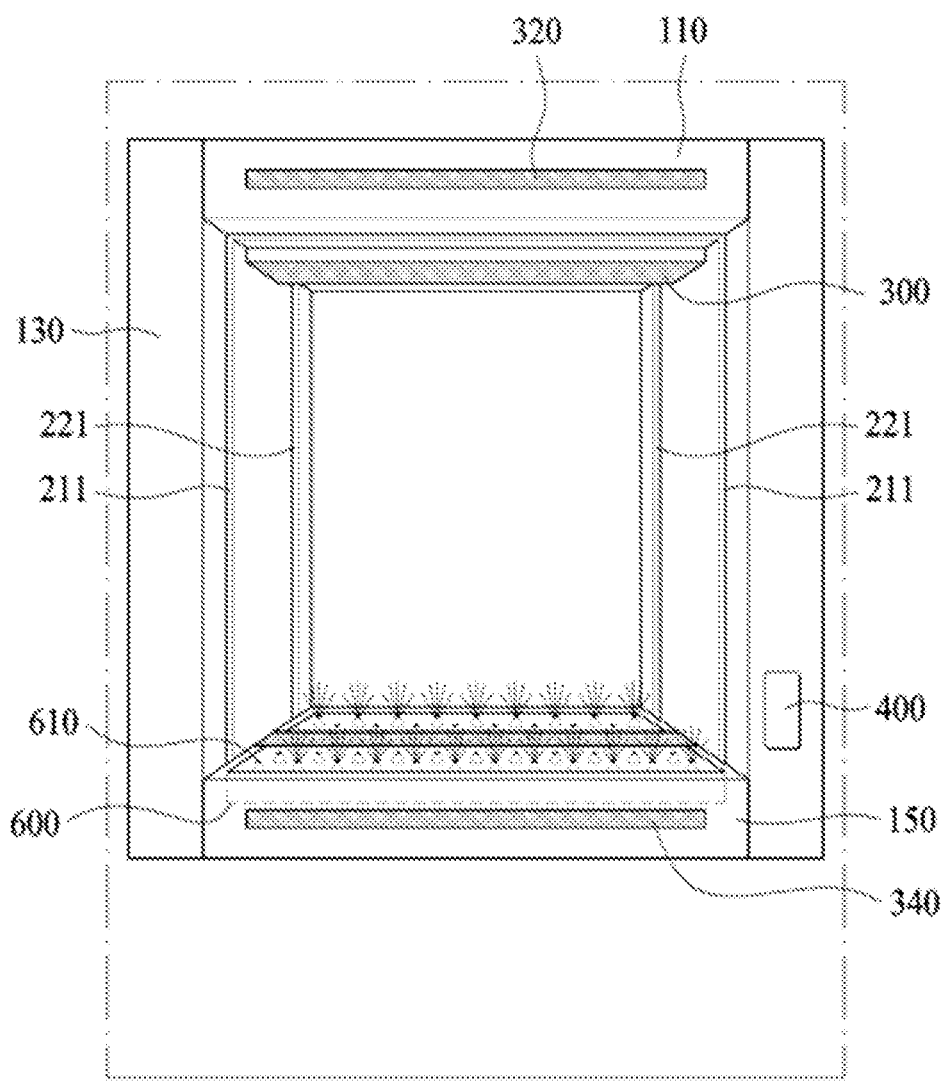
FIG. 10 is a view showing the state in which a dock shelter module according to a third embodiment of the present disclosure is equipped with a dryer and drying spray nozzles.

FIG. 10 is a view showing the state in which a dock shelter module according to a third embodiment of the present disclosure is equipped with a dryer and drying spray nozzles.

As shown in FIG. 10, a drying device 600 may be installed at the bottom frame 150. The drying device 600 may include one or more spray nozzles 610 that spray a drying substance to the bottom frame 150. The drying device 600 may be a steam device that is a device of liquid, etc. treated with water or a chemical into high-temperature and high-pressure steam, or may be a microwave device. The drying spray nozzles 610 are installed at the drying device 600 and can spray high-temperature and high-pressure steam or microwaves to the loading-unloading space.

Since contaminants, humidity, etc. may remain in the loading-unloading space after loading/unloading, there is an advantage that it is possible to manage the loading-unloading space by washing out contaminants and removing humidity by supplying steam or microwaves.

It is shown in FIG. 10 that the drying device 600 and the drying spray nozzles 610 are installed at the bottom frame 150, but the drying device 600 and the drying spray nozzles 610 may be installed at the top frame 110 or the side frames 130 to dry the loading-unloading space.

Figure 11:
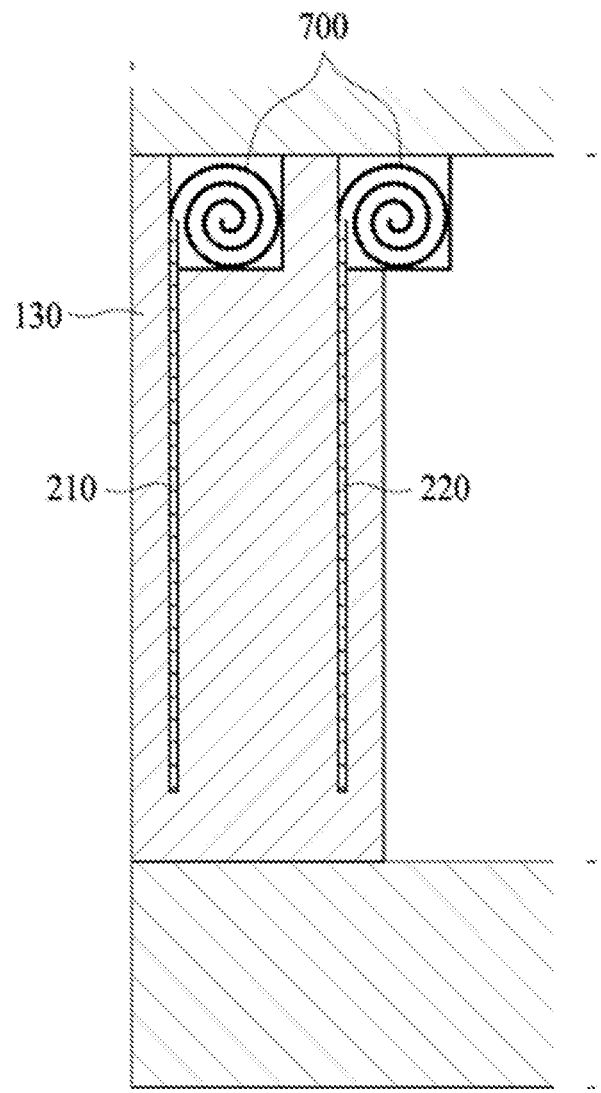
FIG. 11 is a view showing the state in which a dock shelter module according to a fourth embodiment of the present disclosure is equipped with a winder.

FIG. 11 is a view showing the state in which a dock shelter module according to a fourth embodiment of the present disclosure is equipped with a winder.

Referring to FIG. 3, the side frames 130 may include guides 211 and 212, in which the first gate 210 and the second gate 220 are inserted to be guided up and down, on a surface on which the loading-unloading space is formed by the side frames 130. Referring to FIG. 11, a winder 700 that winds the upper portions of the first gate 210 and the second gate 220 under the top frame 110 when the first gate 210 and the second gate 220 are opened may be disposed at the top frame 110. When the first gate 210 and the second gate 220 are opened for loading/unloading, the first gate 210 and the second gate 220 can be lifted along the guides 211 and 221 and wound and kept on the winder 700.

Figure 12:
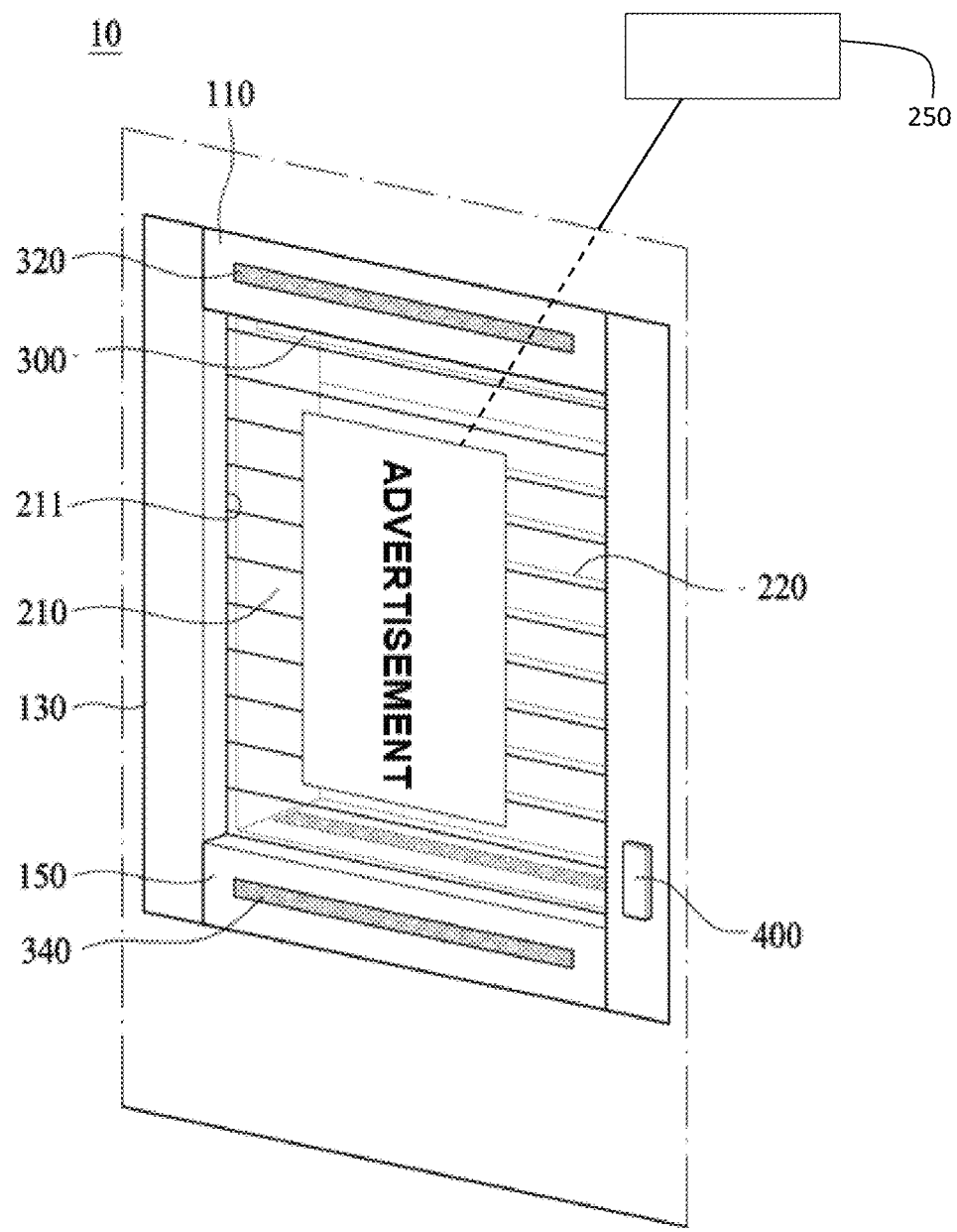
FIG. 12 is a cross-sectional view showing the state in which a commercial video is sent out on a first gate of a dock shelter module according to a fifth embodiment of the present disclosure.

FIG. 12 is a cross-sectional view showing the state in which a commercial video is sent out on a first gate of a dock shelter module according to a fifth embodiment of the present disclosure.

As shown in FIG. 12, in the present disclosure, the first gate 210 may be made of a transparent material and a video device 250 that outputs a video to the first gate 210 may be further included. The video device outputs a video to the front surface of the first gate 210, whereby the output video image can be displayed on the first gate. In this case, when a commercial video is produced and output, it is possible to see the commercial video displayed on the first gate 210 from the outside of the warehouse, so an advertisement and information effect can be achieved.

The dock shelter modules according to the second to fifth embodiments are the same as in the other configuration except for the additional configuration separately described above, as compared with the dock shelter module according to the first embodiment. Accordingly, the configuration not specifically described can be applied to the second to fifth embodiments in the same way, and accordingly, repeated description is omitted.

Although preferred embodiments of the present disclose were described above, it would be apparent to those skilled in the art that the present disclosure may be achieved in other specific types without departing from the scope or spirit other than the embodiments described above. Accordingly, the embodiments describe above should be considered as being exemplifying rather than limiting, so the present disclosure may be changed within the range of the claims and the equivalent range without being limited to the above description.

The invention claimed is:

1. A dock shelter module that is disposed at a side of a warehouse and connects an inside and outside of the warehouse, the dock shelter module comprising:
   a top frame;
   a pair of side frames coupled to both sides of the top frame, longitudinally extending, and forming a loading-unloading space in cooperation with the top frame;
   a bottom frame coupled to lower ends of the pair of side frames and having a dock leveler seated thereon;

a first gate coupled to the top frame, disposed at a front of the loading-unloading space, and opening and closing the outside of the warehouse and the loading-unloading space;

a second gate coupled to the top frame, disposed at a rear of the loading-unloading space, and opening and closing the inside of the warehouse and the loading-unloading space; and an air curtain generator installed on a bottom of the top frame between the first gate and the second gate, and configured to form an air curtain in the loading-unloading space in accordance with whether the first gate and the second gate are opened and closed, wherein the top frame includes:

a top channel configured to communicate with the air curtain generator, and the inside and outside of the warehouse; and a top valve disposed in the top channel, configured to selectively control a flow of air such that cold air in the warehouse flows into the air curtain generator and the air curtain is formed during loading/unloading and such that air outside the warehouse flows into the air curtain generator and the air curtain is formed to dry the loading-unloading space after the loading/unloading is finished.

2. The dock shelter module of claim 1, wherein the top channel includes:

a first top channel having an end connected with the inside of the warehouse and having another end connected to the top valve so that the cold air in the warehouse flows into the top channel;

a second top channel having an end connected with the outside of the warehouse and having another end connected to the top valve so that the air outside the warehouse flows into the top channel; and a third top channel having an end connected to the air curtain generator and having another end connected to the top valve so that the air flowing inside from the top valve flows to the air curtain generator, wherein the air that flows to the air curtain generator can be selectively controlled.

3. The dock shelter module of claim 2, wherein the bottom frame includes:

a bottom channel communicating with the bottom frame and the inside and outside of the warehouse; and a bottom valve disposed in the bottom channel and selectively controlling the flow of air, and the top channel includes:

a first bottom channel having an end connected with the inside of the warehouse and another end connected to the bottom valve so that air sprayed from the air curtain generator is discharged into the warehouse;

a second bottom channel having an end connected with the outside of the warehouse and having another end connected to the bottom valve so that air forming the air curtain is discharged out of the warehouse; and a third channel having an end connected to the bottom of the bottom frame and having another end connected to the bottom valve so that the air sprayed from the air curtain generator flows to the bottom valve, wherein the air that flows to the air curtain generator can be selectively circulated.

4. The dock shelter module of claim 3, further comprising:

an opening-closing sensor configured to sense whether the first gate and the second gate are opened and closed; and a controller configured to control the top valve and the bottom valve and controlling operation of the air curtain generator, wherein the controller outputs an operation signal of the air curtain generator and controls the top valve such that the first top channel and the third top channel communicate with each other when the opening-closing sensor senses opening of the first gate and the second gate, and controls the top valve such that the second top channel and the third top channel communicate with each other when the first gate and the second gate are closed, and outputs an operation stop signal of the air curtain generator to automatically form the air curtain in accordance with the gates are opened and closed after a predetermined time passes.

5. The dock shelter module of claim 4, wherein the controller controls the bottom valve such that the first bottom channel and the third bottom channel communicate with each other when the opening-closing sensor senses that the first gate and the second gate have opened, and controls the bottom valve such that the second bottom channel and the third bottom channel communicate with each other when the opening-closing sensor senses that the first gate and the second gate have closed.

6. The dock shelter module of claim 1, further comprising a winder configured to wind and keep the first gate and the second gate at a lower end of the top frame when the first gate and the second gate are opened, wherein the pair of side frames have guides, in which the first gate and the second gates are inserted to be guided up and down, on a surface on which the pair of side frames form a loading-unloading space.

7. The dock shelter module of claim 1, further comprising a security module that requires input of pre-stored user information to open the first gate and the second gate, wherein the user information and information about opening and closing are transmitted and stored in a server.

8. The dock shelter module of claim 7, wherein the security module is a fingerprint module or an iris module.

9. The dock shelter module of claim 1, wherein a closing speed of the first gate is set higher than a closing speed of the second gate when the first gate and the second gate are closed to close the loading-unloading space to prevent the cold air in the warehouse from flowing outside.

10. The dock shelter module of claim 1, further comprising a sealing device sealing gaps between a freight compartment of a transport vehicle, the top frame, the pair of side frames, and the bottom frame when the transport vehicle is connected to the warehouse, wherein the sealing device is composed of four rectangular frames of top, left, right, and bottom frames, which are disposed in the top frame, the pair of side frames, and the bottom frame of the dock shelter module, respectively, and comes in contact with the freight compartment of the transport vehicle by moving to the transport vehicle when the transport vehicle is connected to the warehouse.

11. The dock shelter module of claim 10, wherein the sealing device includes air spray nozzles disposed on surfaces of the rectangular frames that are brought in contact with the freight compartment, and spraying air.

12. The dock shelter module of claim 1, further comprising a dryer and a drying spray nozzle for drying and sterilizing the loading-unloading space after the loading/unloading is finished.

13. The dock shelter module of claim 12, wherein the dryer is a steam dryer or a microwave dryer.

14. The dock shelter module of claim 1, wherein the second gate has a reflective plate on a first surface thereof that faces the inside of the warehouse, and has an air-pocket insulator on a second surface thereof that faces the loading-unloading space, thereby having a dual structure.

15. The dock shelter module of claim 1, further comprising a bumper configured to attenuate shock and disposed at the top frame, the side frames, and the bottom frame,
    wherein the bumper includes a sensor that recognizes approach when a transport vehicle approaches, and sends out a signal alarm when the transport vehicle approaches within a predetermined distance.

16. The dock shelter module of claim 1, wherein the first gate is made of a transparent material, and
    the dock shelter module further comprises a video device that outputs a video on a front surface of the first gate such that a commercial video can be seen with the first gate closed.

* * * * *